US012613252B2

(12) United States Patent
Hirato et al.

(10) Patent No.: US 12,613,252 B2
(45) Date of Patent: Apr. 28, 2026

(54) TUBE CONVEYANCE RACK

(71) Applicant: Hitachi High-Tech Corporation, Tokyo (JP)

(72) Inventors: Rikako Hirato, Tokyo (JP); Kiyofumi Tetsuka, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 588 days.

(21) Appl. No.: 18/022,335

(22) PCT Filed: Jul. 30, 2021

(86) PCT No.: PCT/JP2021/028290

§ 371 (c)(1),
(2) Date: Feb. 21, 2023

(87) PCT Pub. No.: WO2022/168349

PCT Pub. Date: Aug. 11, 2022

(65) Prior Publication Data

US 2023/0341429 A1      Oct. 26, 2023

(30) Foreign Application Priority Data

Feb. 4, 2021     (JP) ................................. 2021-016854

(51) Int. Cl.
G01N 35/04          (2006.01)
(52) U.S. Cl.
CPC ..... G01N 35/04 (2013.01); *G01N 2035/0412* (2013.01)

(58) Field of Classification Search
CPC .. G01N 35/04; G01N 2035/0412; G01N 1/00; B01L 2200/025; B01L 2200/18; B01L 2300/123; B01L 9/06
See application file for complete search history.

(56) References Cited

U.S. PATENT DOCUMENTS

| | | |
|---|---|---|
| 5,897,090 A | 4/1999 | Smith et al. |
| 2006/0266719 A1 | 11/2006 | Knight et al. |
| 2020/0122149 A1 | 4/2020 | Liu et al. |

FOREIGN PATENT DOCUMENTS

| | | | | |
|---|---|---|---|---|
| EP | 3136109 A1 * | 3/2017 | ............. | G01N 35/04 |
| JP | 11-218537 A | 8/1999 | | |

(Continued)

OTHER PUBLICATIONS

Japanese Office Action received in corresponding Japanese Application No. 2021-016854 mailed Dec. 5, 2023.

(Continued)

*Primary Examiner* — John McGuirk
(74) *Attorney, Agent, or Firm* — MATTINGLY & MALUR, PC

(57)          ABSTRACT
A tube conveyance rack (10) comprises a rack body (14) having a tube insertion hole (12) that opens upward and is for accommodating a tube and a gripping member (16) disposed inside the tube insertion hole (12). The gripping member (16) has a frame-shaped base part (30) that has a frame shape and is provided horizontally, and a plurality of arm parts (32) that extend upward from the frame-shaped base part (30). The frame-shaped base part (30) has, at the parts joined to the arm parts (32), thick parts (30*a*) that are thick in the horizontal direction orthogonal to the extension direction of the frame-shaped base part (30).

13 Claims, 12 Drawing Sheets

(56) References Cited

FOREIGN PATENT DOCUMENTS

| JP | 2008-537147 | A | | 9/2008 |
|----|-------------|---|---|--------|
| JP | 2010271204 | A | * | 12/2010 |
| JP | 2014206443 | A | * | 10/2014 |
| JP | 2015075404 | A | * | 4/2015 |

OTHER PUBLICATIONS

International Preliminary Report on Patentability received in corresponding International Application No. PCT/JP2021/028290 dated Aug. 17, 2023.
International Search Report of PCT/JP2021/028290 dated Oct. 12, 2021.

* cited by examiner

TUBE CONVEYANCE RACK

TECHNICAL FIELD

The present invention relates to a tube conveyance rack.

BACKGROUND

Conventionally, an automatic analyzer for analyzing a sample and a pretreatment device for pretreating the sample before analysis are used. Before the automatic analyzer or the pretreatment device performs processing on a sample, a tube (test tube) containing the sample to be processed is conveyed to a predetermined position. At this time, the tube is accommodated and conveyed in a tube conveyance rack.

Conventionally, there has been proposed a tube conveyance rack including a gripping member that grips a tube accommodated in the tube conveyance rack in order to prevent the tube from falling off from the tube conveyance rack or to maintain the tube in a prescribed posture.

For example, Patent Document 1 discloses a tube conveyance rack including a gripping member disposed in a housing portion that houses a plurality of types (a plurality of diameters) of tubes in a standing posture, the gripping member having a base portion and an arm part (support piece) that extends upward from the base portion and supports the tubes from the side by elastic force.

CITATION LIST

Patent Literature

Patent Document 1: JP 2014-206443 A

SUMMARY

Technical Problem

In the conventional tube conveyance rack including the gripping member that grips the tube from the side by the elastic force of the arm part extending toward the upper side, the gripping force by the gripping member may be insufficient. When the gripping force of the gripping member is insufficient, in some cases the tube accommodated in the tube conveyance rack floats or the posture of the tube cannot be maintained in a prescribed posture. For example, a case is considered in which after blood is subjected to a centrifuge using a separation agent, only serum is dispensed from a tube containing separated serum and blood clots and a separation agent between them. When a tip of a dispensing device is inserted into the tube to suck the serum, the tip may accidentally enter the separation agent. When the tip is pulled up from that state, an upward force is applied to the tube via the separating agent. In such a case, if the gripping force of the gripping member is insufficient, the tube floats from the tube conveyance rack or the posture of the tube changes from a prescribed posture.

An object of the present invention is to improve gripping force for gripping a tube in a tube conveyance rack for gripping the tube from the side by elastic force of arm parts extending upward.

Solution to Problem

A tube conveyance rack according to the present disclosure includes a rack body having a tube insertion hole that is opened upward, and a gripping member arranged in the tube insertion hole, in which the gripping member includes a frame-shaped base part formed in a frame shape and arranged horizontally along an inner wall of the tube insertion hole and a plurality of arm parts that extend upward from the frame-shaped base part and grip a tube inserted in the tube insertion hole from the side by elastic force of the arm parts, and the frame-shaped base part includes a thick part that is thick in a horizontal direction orthogonal to an extension direction of the frame-shaped base part at a joint portion with the arm part.

Advantageous Effects of Invention

According to the present invention, it is possible to improve gripping force for gripping a tube in a tube conveyance rack for gripping the tube from the side by elastic force of arm parts extending upward.

DESCRIPTION OF EMBODIMENTS

Figure 1:
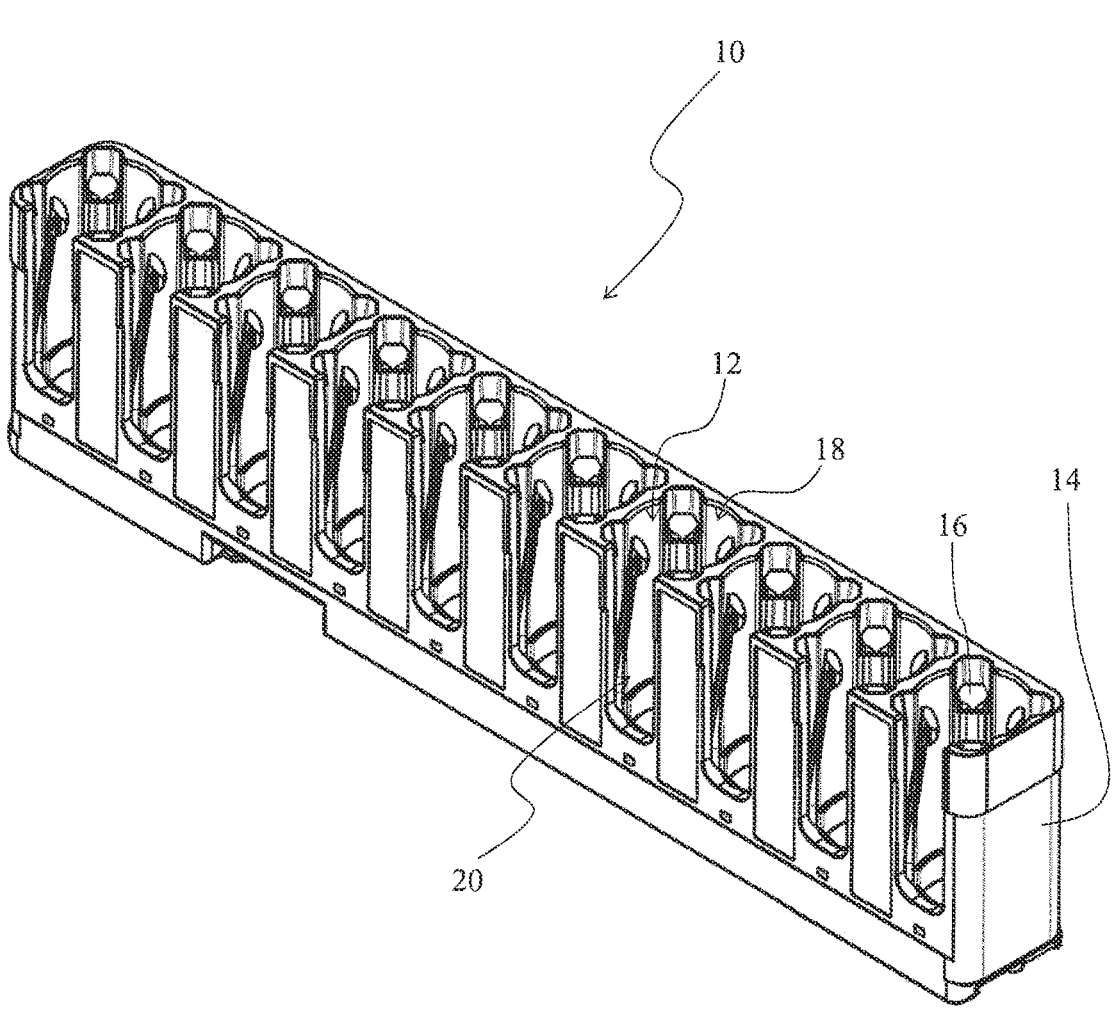
FIG. 1 is an external perspective view of a tube conveyance rack according to the present embodiment.
Figure 2:
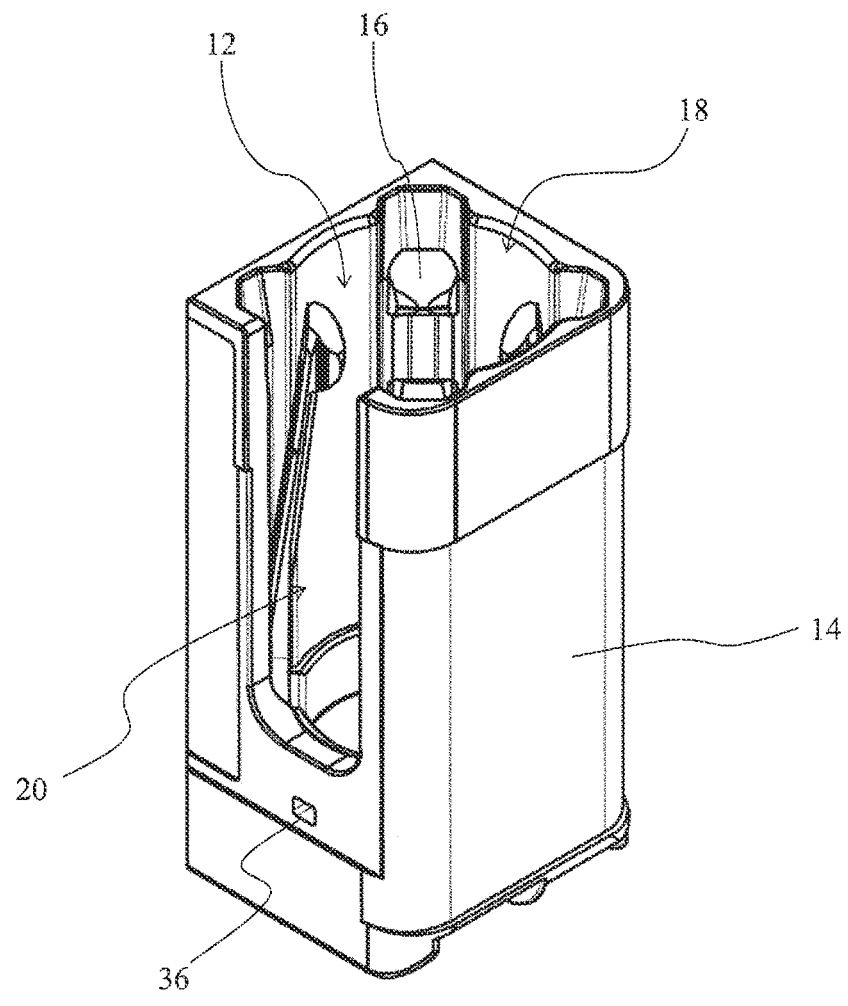
FIG. 2 is an enlarged perspective view in which one of tube insertion holes of the tube conveyance rack according to the present embodiment is enlarged.

FIG. 1 is an external perspective view of a tube conveyance rack 10 according to an embodiment of the present invention. FIG. 2 is an enlarged perspective view of one of tube insertion holes 12 in the tube conveyance rack 10. The tube conveyance rack 10 includes a rack body 14 having the tube insertion holes 12 for accommodating tubes (test tubes), and gripping members 16 disposed inside the tube insertion holes 12. The tube insertion hole 12 has an upper opening 18 opened upward, and the tube is inserted into the tube insertion hole 12 from the upper opening 18. The gripping member 16 grips the side of the tube inserted in the tube insertion hole 12. With this configuration, the tube is maintained in a standing posture, in other words, a posture in which the opening of the tube faces upward in the accommodated state in the tube insertion hole 12. The tube insertion hole 12 has a side opening 20 opened to the side. The side opening 20 allows an operator to check a sample in the tube accommodated in the tube insertion hole 12, a cord attached to the tube, and the like. In the present specification, words and phrases indicating directions and orientations such as up and down and side directions indicate directions and the like in the above-described use state.

As will be described in detail later, after the rack body 14 and the gripping members 16 are manufactured separately, the gripping members 16 are inserted into the tube insertion holes 12 of the rack body 14 and integrated to constitute the tube conveyance rack 10. Both the rack body 14 and the gripping members 16 can be made of resin, and can be manufactured by a method such as injection molding.

The tube conveyance rack 10 can accommodate various types of tubes. The various types of tubes are tubes that differ in diameter, length, bottom surface shape, with or without blades (plate-shaped members erected on side surfaces along the circumferential direction of the bottom portion), and the like. Therefore, the diameter of the tube insertion hole 12 is equal to or larger than the maximum diameter of the tube assumed to be conveyed by the tube conveyance rack 10. In addition, as will be described later, the tube conveyance rack 10 has various features to suitably grip various types of tubes.

In the tube conveyance rack 10 illustrated in FIG. 1, the rack body 14 has a substantially rectangular parallelepiped shape, and the tube insertion holes 12 arranged in a line are provided at ten locations, but the arrangement and number of the tube insertion holes 12 of the tube conveyance rack 10 are not limited thereto.

Figure 3:
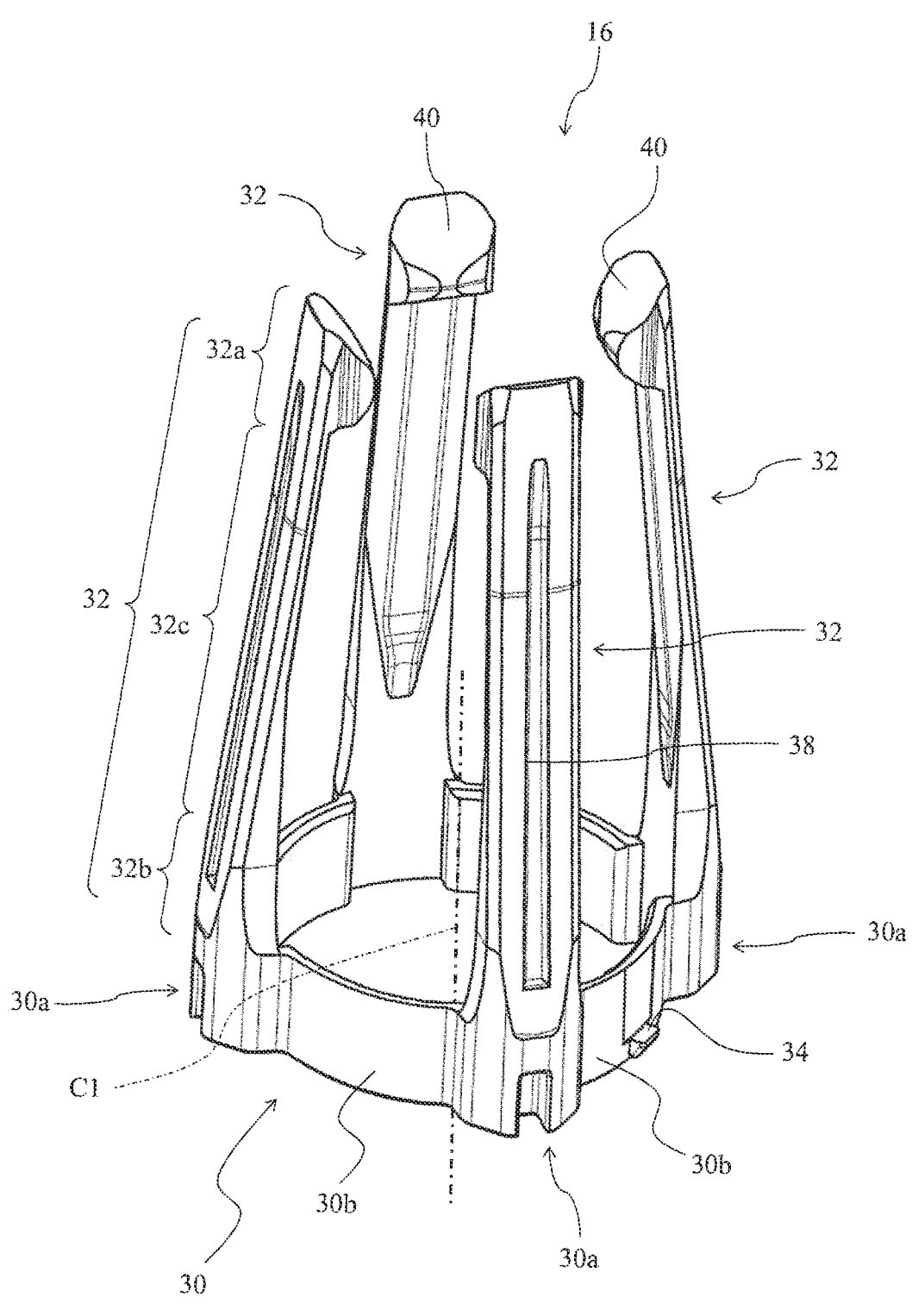
FIG. 3 is a perspective view of a gripping member.
Figure 4:
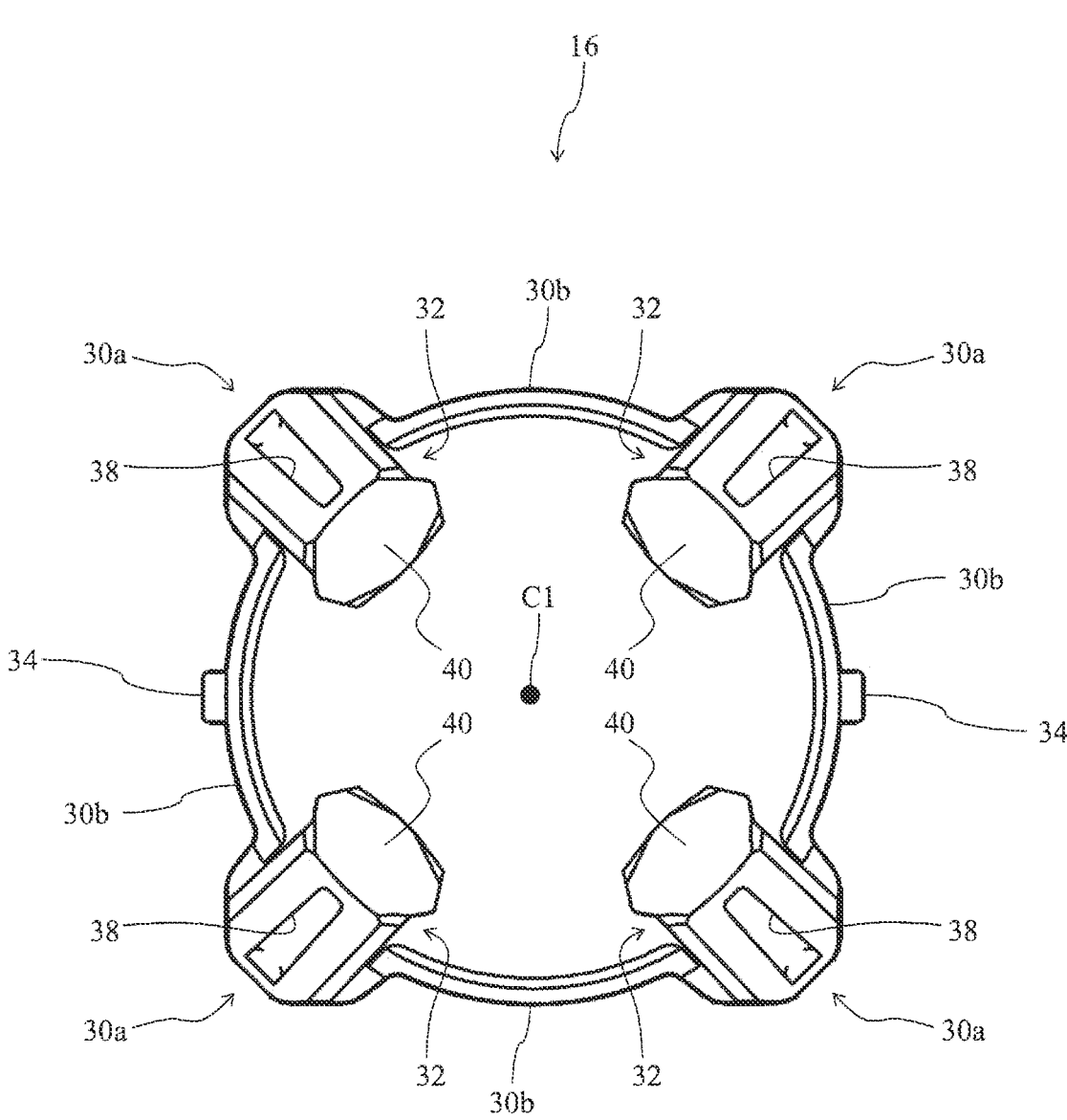
FIG. 4 is a plan view of the gripping member.

FIG. 3 is a perspective view of the gripping member 16, and FIG. 4 is a plan view of the gripping member 16. The gripping member 16 has a frame shape and includes a frame-shaped base part 30 provided in the horizontal direction (so as to extend in the horizontal direction) and a plurality of arm parts 32 extending upward from the frame-shaped base part 30. The plurality of arm parts 32 are provided at equal intervals along the extending direction of the frame-shaped base part 30. According to the present embodiment, the gripping member 16 has four arm parts 32, but the number of the arm parts 32 may be three or more.

An axis passing through the center of the space surrounded by the frame-shaped base part 30 and extending in the vertical direction is referred to as a central axis C1. According to the present embodiment, the frame-shaped base part 30 has a substantially annular shape centered on the central axis C1 in plan view, but the shape of the frame-shaped base part 30 is not limited thereto. For example, the frame-shaped base part 30 may have a polygonal shape centered on the central axis C1 in plan view. In addition, the frame shape is not always a shape completely surrounding the central axis C1 but may be a shape with a discontinued part. Therefore, for example, as in a modification described later (see FIG. 12), the frame-shaped base part 30 may have, instead of an annular shape completely surrounding the central axis C1, a shape with a discontinued part.

The frame-shaped base part 30 has a thick part 30*a* that is thick in a horizontal direction (inside or outside) orthogonal to the extending direction of the frame-shaped base part 30, at a joint portion with each arm part 32. In particular, according to the present embodiment, the thick part 30*a* is formed to bulge laterally to the outside of the frame-shaped base part 30. Since the thick part 30*a* bulges outward, the outer wall of the frame-shaped base part 30 has a shape protruding outward in the thick part 30*a* as illustrated in FIG. 4. On the other hand, the inner wall of the thick part 30*a* does not protrude inward, and according to the present embodiment, the inner wall of the frame-shaped base part 30 has a substantially annular shape as a whole in plan view. Here, the inner side means the central axis C1 side, and the outer side means the opposite direction. An effect of the thick part 30*a* will be described later.

Since the frame-shaped base part 30 has the thick part 30*a*, it can be said that the frame-shaped base part 30 is configured to include the thick part 30*a* and edge parts 30*b* connecting the adjacent thick parts 30*a*. As described above, according to the present embodiment, since the frame-shaped base part 30 has a substantially annular shape centered on the central axis C1, each edge part 30*b* is an arc portion having an arc shape centered on the central axis C1. When the frame-shaped base part 30 is a polygon, the thick parts 30*a* may be located at positions of vertexes of the polygon, and each edge part 30*b* may be linear so as to form a side of the polygon.

In addition, the frame-shaped base part 30 has protruding parts 34 protruding laterally to the outside from the outer wall. According to the present embodiment, the protruding parts 34 are provided on each of the pair of opposing edge parts 30*b* (in other words, two edge parts 30*b*). When the gripping member 16 is disposed in the tube insertion hole 12, the protruding parts 34 are fitted into fitting holes 36 (see FIG. 2) provided in the inner wall of the tube insertion hole 12. With this configuration, the upward movement of gripping member 16 with respect to the rack body 14 is restricted.

Each arm part 32 is a plate-shaped portion extending upward from the thick part 30*a* of the frame-shaped base part 30 and expanding so as to face the central axis C1. When an outward force is applied, most of each arm part 32 is elastically deformed outward. In the elastically deformed state, an inward elastic force (restoring force) acts on each arm part 32. In other words, each arm part 32 acts as a leaf spring. Therefore, when the tube is inserted inside each arm part 32 and each arm part 32 is elastically deformed outward by the tube, a force inward from each arm part 32 is applied to the side of the tube by the elastic force of each arm part 32. With this force, each arm part 32 grips the tube from the side.

In particular, according to the present embodiment, each arm part 32 includes a distal end part 32*a*, a root part 32*b* connected to the frame-shaped base part 30 (thick part 30*a*), and an extending part 32*c* connecting the distal end part 32*a* and the root part 32*b*, and each arm part 32 grips the tube from the side by bringing the distal end part 32*a* into contact with the side wall of the tube. The root part 32*b* is greater in width (length in the extending direction of the frame-shaped base part 30) than the extending part 32*c*. The root part 32*b* may be thicker than the extending part 32*c*.

As described above, since the joint portion of the frame-shaped base part 30 with each arm part 32 is the thick part 30*a*, the thickness of each arm part 32 (particularly, the root part 32*b* or the extending part 32*c*) can be increased. As a result, the elastic force of each arm part 32 can be increased, and the tube gripping force by the gripping member 16 can be improved.

In order to increase the elastic force of each arm part 32, each arm part 32 may be made thick, and it is conceivable that only each arm part 32 is made thick without providing the thick part 30*a* in the frame-shaped base part 30. However, in such a case, the root part of the thick arm part 32 is joined to the thin frame-shaped base part 30. In this case, when the arm part 32 is elastically deformed, a large load is applied to the joint portion, and sufficient elastic force cannot be exerted, or the arm part 32 may be damaged or deformed. Therefore, the joint portion between the frame-shaped base part 30 and each arm part 32 is formed as the thick part 30*a*, and each arm part 32 is made thick.

In particular, according to the present embodiment, the thick part 30a bulges outward to be thick, and each arm part 32 also bulges laterally to the outside from the inner surface of the frame-shaped base part 30 to be thick. Specifically, the outer side surface of each arm part 32 and the outer side surface of the thick part 30a are flush with each other, and the inner side surface of each arm part 32 is also flush with the inner side surface of the thick part 30a. That is, each arm part 32 extends from the outside to the upper side of the inner surface of the frame-shaped base part 30. This prevents the tube having a large diameter from interfering with the frame-shaped base part 30 and each arm part 32.

A groove 38 extending vertically is provided on the outer surface of each arm part 32. By providing the groove 38 extending vertically, the rigidity of the arm part 32 is increased as compared with the case where the groove 38 is not provided. Thus, the durability of the gripping member 16 is improved.

Each arm part 32 extends upward while inclining inward from the thick part 30a in an equilibrium state where no external force is applied. In other words, the distal end part 32a of each arm part 32 is located inside the inner wall of the frame-shaped base part 30 in plan view. With this configuration, the gripping member 16 can suitably grip the tube having a smaller diameter. At least the gripping member 16 can grip a tube having a diameter smaller than the diameter of (the inner wall of) the frame-shaped base part 30. In the equilibrium state, the distal end parts 32a of the plurality of arm parts 32 are located on the same circumference centered on the central axis C1.

In addition, since each of the arm parts 32 has a shape extending upward from the frame-shaped base part 30, each of the arm parts 32 can grip the upper side of the side surface of the tube, as compared with a case where each of the arm parts 32 extends downward. With this configuration, even in a tube whose bottom surface is tapered and whose inclined surface is long in the vertical direction (has a large taper), each arm part 32 can grip a vertical surface that is not the inclined surface among the side surfaces of the tube. If each arm part 32 grips the inclined surface of the side surface of the tube, an upward force acts on the tube from each arm part 32 due to the gripping, and suitably gripping the tube may be difficult.

At the distal end part 32a of each arm part 32, an inclined surface 40 facing the upper side and the inner side is formed. The inclined surface 40 is a portion that receives the bottom surface of the tube inserted from the upper opening 18 of the tube insertion hole 12. With this configuration, when the tube is inserted into the tube insertion hole 12, the tube receives from each arm part 32 (inclined surface 40) a force in a direction toward the center of the tube insertion hole 12. This guides the tube to be placed in the center of the tube insertion hole 12.

Figure 5:
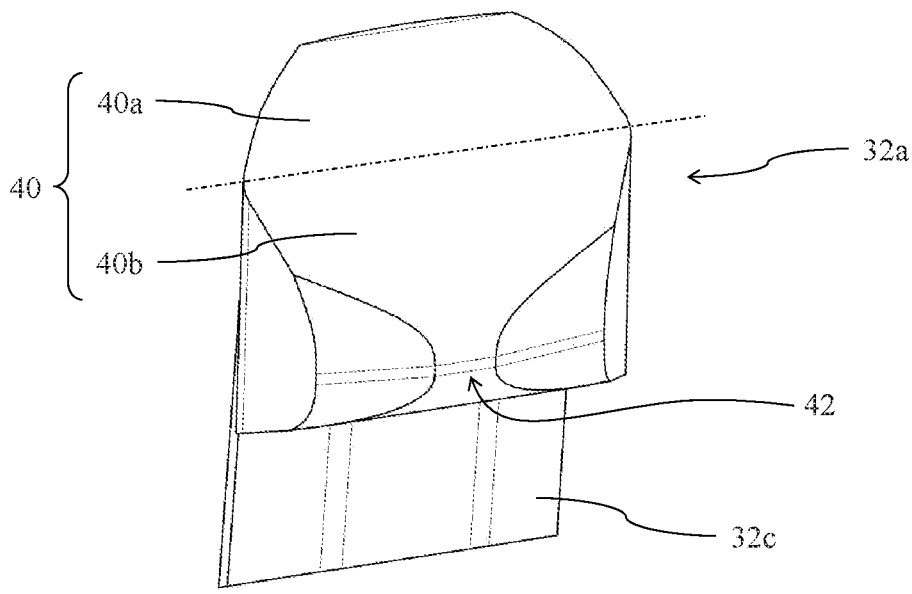
FIG. 5 is a perspective view of a distal end part of an arm part.
Figure 6:
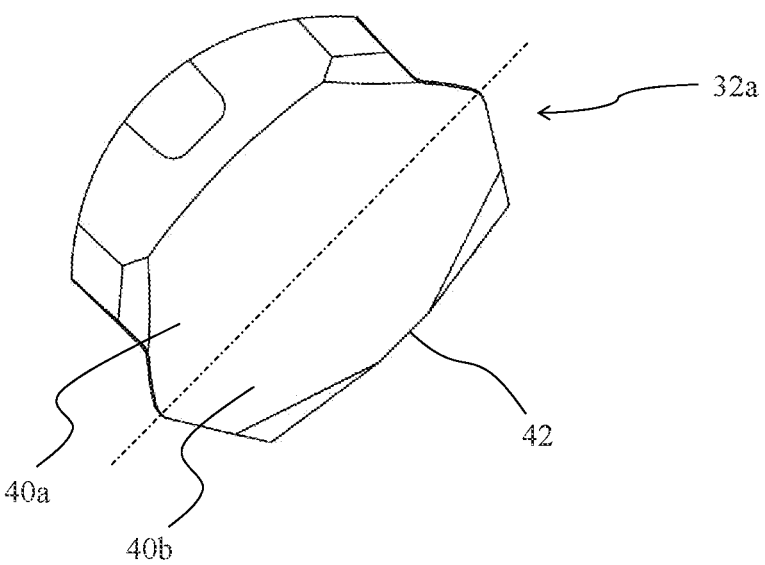
FIG. 6 is a plan view of the distal end part of the arm part.

FIG. 5 is an enlarged perspective view of the distal end part 32a of the arm part 32, and FIG. 6 is a plan view of the distal end part 32a. According to the present embodiment, the maximum width of the inclined surface 40 (the width at the position of the dash-dotted line in FIGS. 5 and 6) is greater than the width of the extending part 32c of the arm part 32. In particular, according to the present embodiment, the inclined surface 40 has a wide region 40a that is wider (in the horizontal direction orthogonal to the inward and outward directions) from the upper side toward the lower side. According to the present embodiment, a substantially upper half (region above the dash-dotted line in FIGS. 5 and 6) of the inclined surface 40 is the wide region 40a. The width of the lower end of the wide region 40a is the maximum width of the inclined surface 40.

With this configuration, the inclined surface 40 can receive the bottom surface of the tube over a larger area, and the tube can be more reliably guided to the center side of the tube insertion hole 12. Furthermore, as described below, since the maximum width of the inclined surface 40 is greater than the width of the extending part 32c, the blades provided on the bottom surface of the tube are prevented from entering between the arm part 32 and the inner wall of the tube insertion hole 12.

Figure 7:
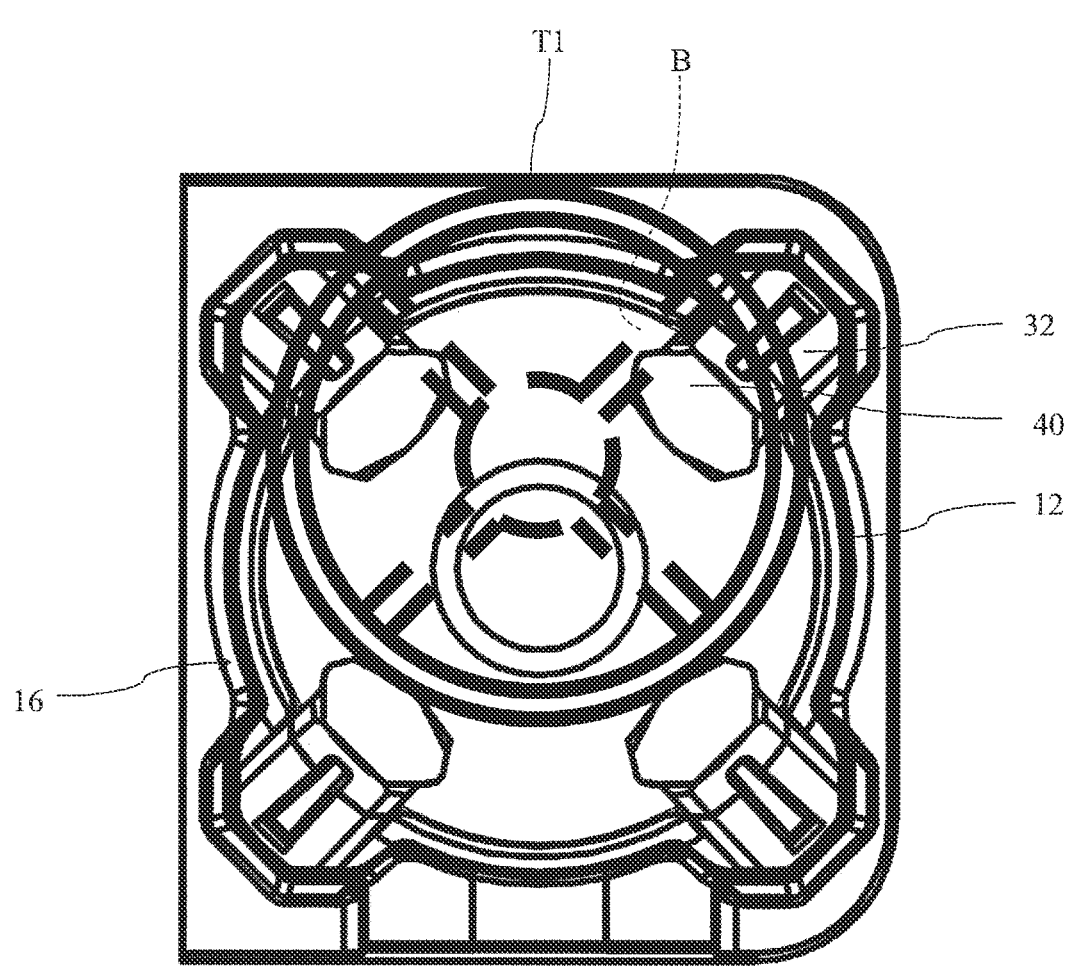
FIG. 7 is a plan view illustrating a state in which a tube with a blade is inserted into a tube insertion hole while being displaced.

FIG. 7 is a plan view illustrating a state in which a tube T1 with blades B is being inserted, as being adjusted in place, into the tube insertion hole 12 in which the gripping member 16 is disposed. If the maximum width of the inclined surface 40 is smaller than the width of the extending part 32c, the blades B may be sandwiched between the circumferential side surface of the arm part 32 and the inner wall of the tube insertion hole 12, as illustrated in FIG. 7, at a position where the blades B come just above between the arm part 32 and the inner wall of the tube insertion hole 12; more specifically, between the circumferential side surface of the arm part 32 (the surface on the extending direction side of the frame-shaped base part 30) and the inner wall of the tube insertion hole 12 facing thereto, when the tube T1 is inserted into the tube insertion hole 12 (that is, moved downward). Here, if the maximum width of the inclined surface 40 is greater than the width of the extending part 32c, even when the tube T1 is inserted into the tube insertion hole 12 at the position illustrated in FIG. 7, the blades B abut on the end in the width direction of the inclined surface 40, and further insertion at that position is suppressed, so that the blades B are prevented from being sandwiched between the circumferential side surface of the arm part 32 and the inner wall of the tube insertion hole 12. Further, when the blades B abut on the inclined surface 40, a force in the inward direction is applied to (the blades B of) the tube T1 from the end in the width direction of the inclined surface 40, so that the tube T1 can also be guided in the center direction (the lower side in FIG. 7) of the tube insertion hole 12.

Returning to FIGS. 5 and 6, the inclined surface 40 is located below the wide region 40a, and has a narrow region 40b whose width becomes narrower from the upper side to the lower side. According to the present embodiment, a substantially lower half (a region below the dash-dotted line in FIGS. 5 and 6) of the inclined surface 40 is the narrow region 40b. The width of the lower end of the narrow region 40b is the minimum width of the inclined surface 40.

Further, at the distal end part 32a of the arm part 32, a contact surface 42 which is a surface facing the inside and comes into contact with the tube is formed. The contact surface 42 communicates with the lower end of the narrow region 40b, and the width thereof is equal to the width of the lower end of the narrow region 40b. As described above, since the width of the lower end of the narrow region 40b is the minimum width of the inclined surface 40, the maximum width of the inclined surface 40 is considerably wide (wider than the width of the extending part 32c), while the width of the contact surface 42 is also considerably small. By reducing the width of the contact surface 42 (that is, by reducing the contact area with the tube), the tube can be more suitably guided to the center of the tube insertion hole 12 (centering performance is improved).

Figure 8:
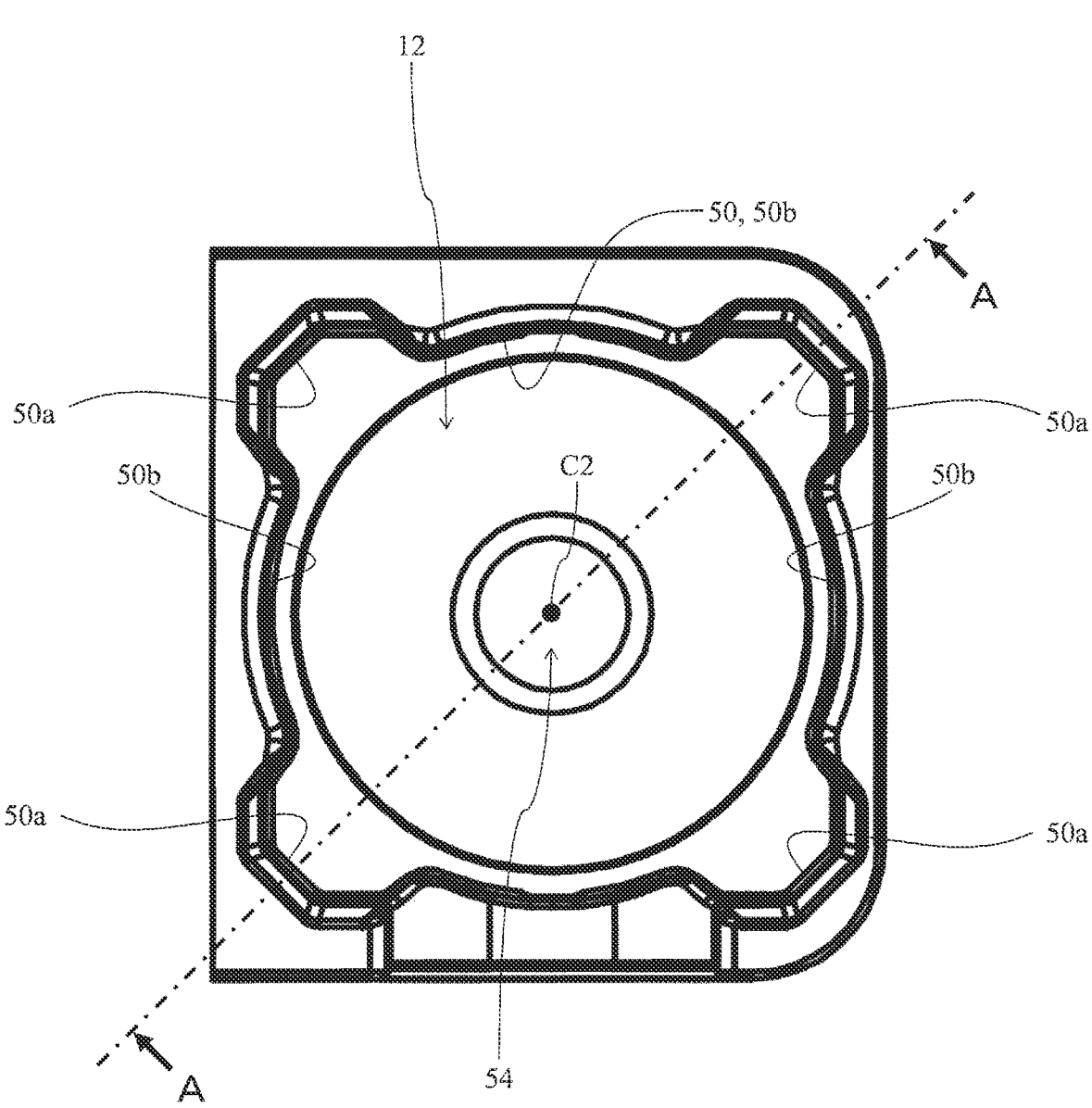
FIG. 8 is a plan view of the tube insertion hole.
Figure 9:
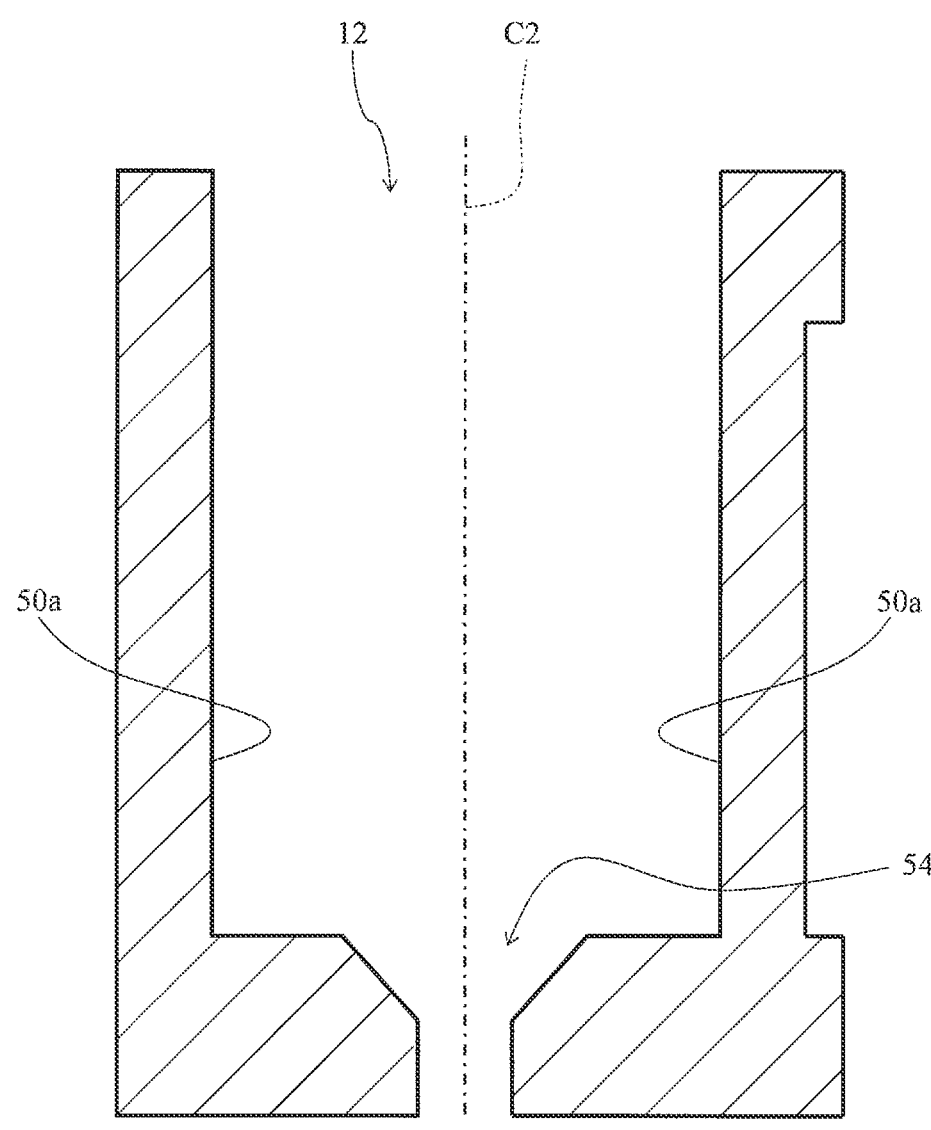
FIG. 9 is a cross-sectional view of the tube insertion hole.

FIG. 8 is a plan view of the tube insertion hole 12, and FIG. 9 is a cross-sectional view viewed from the A-A direction of FIG. 8. As illustrated in FIG. 9, an inner wall 50 of the tube insertion hole 12 is erected in the vertical direction, and the horizontal cross-sectional shape at an arbitrary position of the tube insertion hole 12 is the same as the shape of the upper opening 18. Note that the inner wall 50 may be tapered (inclined) so as to spread outward in the vicinity of the upper opening 18 in order to further secure a clearance space when the arm part 32 is elastically deformed. An axis passing through the center of the tube insertion hole 12 and extending in the vertical direction is referred to as a central axis C2.

The shape of the inner wall 50 of the tube insertion hole 12 (the shape of the upper opening 18) in plan view is a shape conforming to the outer shape of the frame-shaped base part 30 of the gripping member 16. In other words, the inner wall 50 has a recess 50*a* recessed outward in accordance with the shape of the thick part 30*a* of the frame-shaped base part 30, and an edge wall part 50*b* that has a shape in accordance with the shape of the edge part 30*b* of the frame-shaped base part 30 and connects the adjacent recesses 50*a*. According to the present embodiment, since the edge part 30*b* of the frame-shaped base part 30 has an arc shape, the edge wall part 50*b* is an arc portion having an arc shape centered on the central axis C2. Since the edge wall part 50*b* has an arc shape centered on the central axis C2, when the bottom surface of the tube inserted into the tube insertion hole 12 hits the edge wall part 50*b*, the tube can be guided to the central axis C2 side.

A bottom surface hole 54 is provided at the center of the bottom surface of the tube insertion hole 12. The bottom surface hole 54 is a hole into which the tip of the tube enters. As illustrated in FIG. 9, the bottom surface hole 54 includes a cone-shaped portion whose diameter decreases toward the lower side and a through hole. The cone-shaped portion provides a function of guiding the tube to the center side of the tube insertion hole 12, and the through hole is a contrivance in molding processing.

Figure 10:
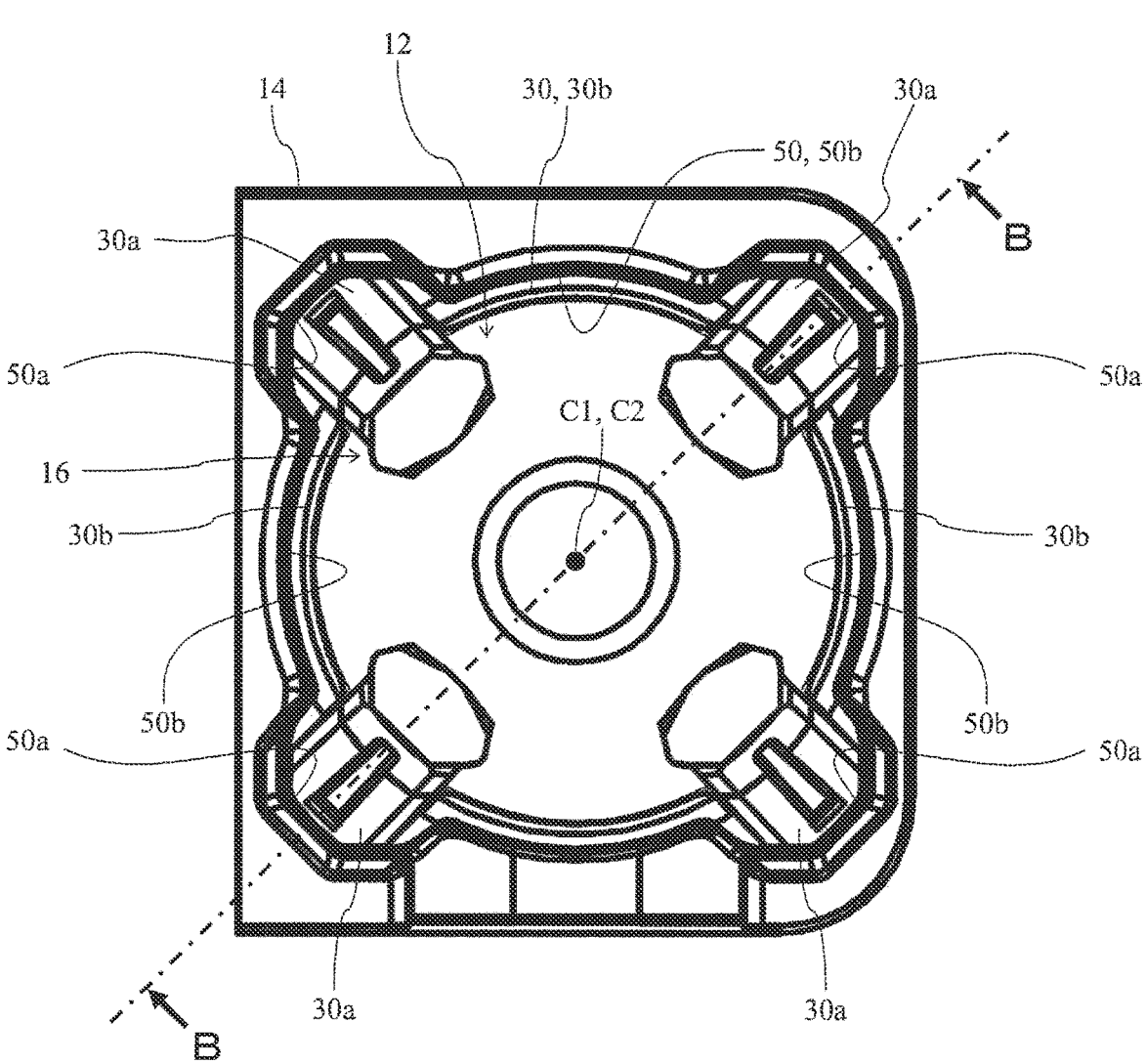
FIG. 10 is a plan view of the tube insertion hole in which the gripping member is disposed.
Figure 11:
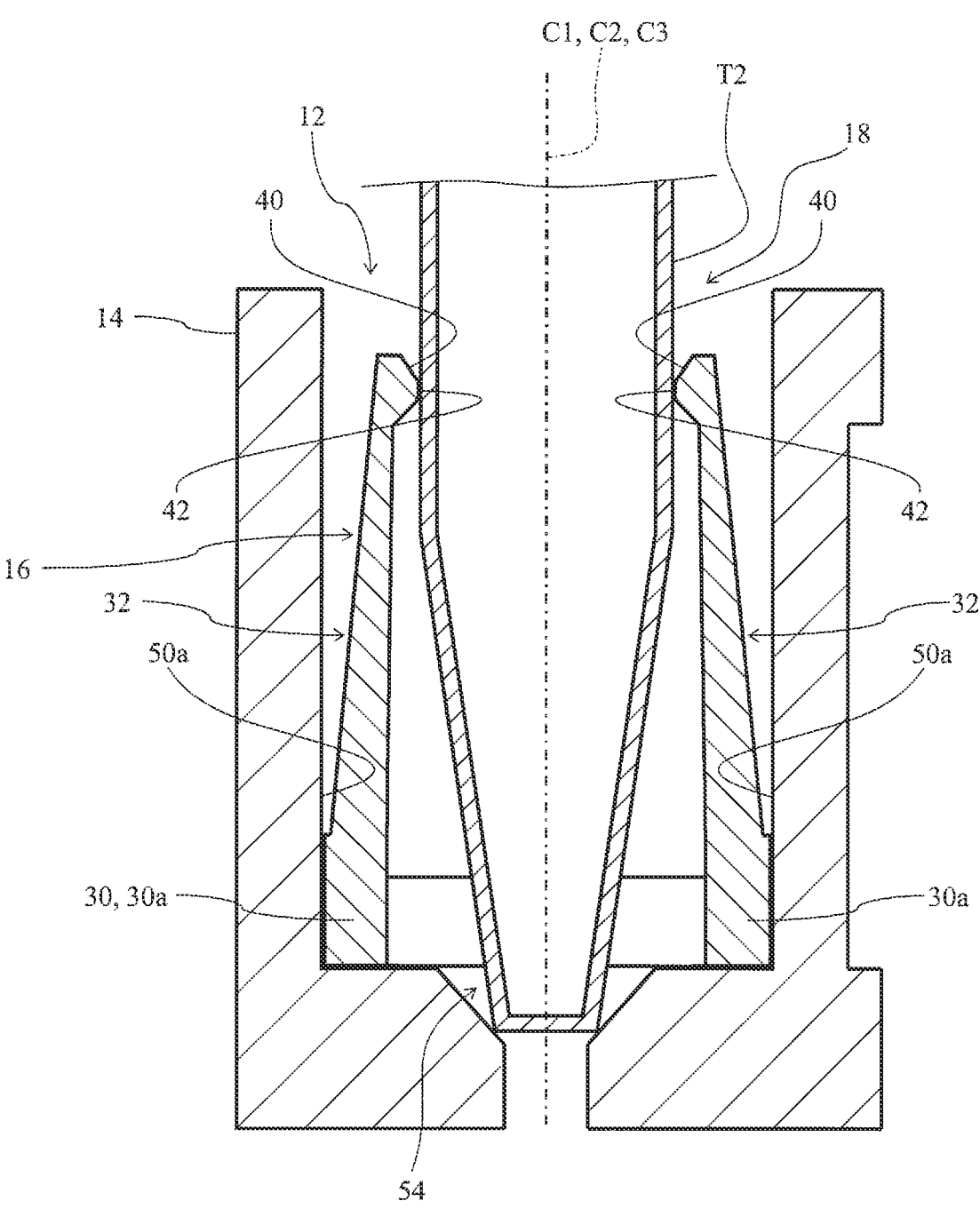
FIG. 11 is a cross-sectional view of the tube insertion hole illustrating a state in which the gripping member grips the tube.

FIG. 10 is a plan view of the tube insertion hole 12 in which the gripping member 16 is disposed, and FIG. 11 is a cross-sectional view viewed from the B-B direction of FIG. 10. As illustrated in FIGS. 10 and 11, the gripping member 16 is disposed in the tube insertion hole 12 in a posture in which the frame-shaped base part 30 is disposed in the horizontal direction along the inner wall 50 of the tube insertion hole 12. In the disposed state, the central axis C1 of the frame-shaped base part 30 and the central axis C2 of the tube insertion hole 12 coincide with each other.

According to the present embodiment, the frame-shaped base part 30 is disposed at the lowermost portion of the tube insertion hole 12. In other words, the frame-shaped base part 30 is disposed such that its lower surface is in contact with the bottom surface of the tube insertion hole 12. In a state where the gripping member 16 is disposed in the tube insertion hole 12, the upper end of the arm part 32 is located in the tube insertion hole 12. In other words, the upper end of the arm part 32 is positioned below the upper opening 18.

As described above, since the shape of the inner wall 50 of the tube insertion hole 12 corresponds to the outer shape of the frame-shaped base part 30 in plan view, the frame-shaped base part 30 is accommodated along the inner wall 50. In particular, according to the present embodiment, the thick part 30*a* of the frame-shaped base part 30 and the recess 50*a* of the inner wall 50 are fitted to each other, whereby the gripping member 16 is fixed in the tube insertion hole 12. Specifically, when the thick part 30*a* is inserted into the recess 50*a*, the upward movement of gripping member 16 with respect to the rack body 14 is restricted by the frictional force between the outer wall of thick part 30*a* and recess 50*a*. By inserting the thick part 30*a* into the recess 50*a*, the rotation of the gripping member 16 in the horizontal direction about the central axis C1 is restricted. As described above, the upward movement of the gripping member 16 with respect to the rack body 14 is also restricted by fitting the protruding part 34 provided on the frame-shaped base part 30 into a fitting hole 36 (see FIG. 2) provided on the inner wall 50.

According to the present embodiment, as described above, since the gripping member 16 is fixed in the tube insertion hole 12 mainly by the fitting between the thick part 30*a* and the recess 50*a*, when the thick part 30*a* is inserted into the recess 50*a*, the thick part and the recess come into close contact with each other without a gap. On the other hand, the edge part 30*b* of the frame-shaped base part 30 and the edge wall part 50*b* of the inner wall 50 are not necessarily in close contact with each other (there may be a small margin).

If the gripping member 16 is fixed in the tube insertion hole 12 by bringing the entire outer wall of the frame-shaped base part 30 into close contact with the inner wall 50 as in the related art (for example, Patent Document 1), when the gripping member 16 is inserted into the tube insertion hole 12, the outer surface of the frame-shaped base part 30 and the inner wall 50 come into contact with each other, and a considerably strong force is required for the insertion. In particular, when there is an individual difference in the sizes of the tube insertion hole 12 and the gripping member 16, this may be remarkable. In such a case, the frame-shaped base part 30 may be distorted at the time of insertion. When the frame-shaped base part 30 is distorted, the extending direction of the arm part 32 and the like also change, and the tube cannot be suitably guided to the central axis C2 side of the tube insertion hole 12 by the plurality of arm parts 32.

In this regard, according to the present embodiment, since only the thick part 30*a* and the recess 50*a* are in close contact with each other, and a margin can be provided between the edge part 30*b* and the edge wall part 50*b*, the gripping member 16 can be easily disposed in the tube insertion hole 12 as compared with the case where the entire outer wall of the frame-shaped base part 30 is in close contact with the inner wall 50. In addition, according to the present embodiment, since the edge part 30*b* has an arc shape (shape bulging outward) centered on the central axis C1, the edge part 30*b* is easily deformed to be recessed inward as compared with the case where the edge part 30*b* is linear, so that the gripping member 16 can be more easily disposed in the tube insertion hole 12. Since the gripping member 16 can be easily disposed in the tube insertion hole 12, the possibility that the frame-shaped base part 30 is distorted can be reduced. As described above, according to the present embodiment, both fixability of the gripping member 16 to the tube insertion hole 12 and assemblability of the tube conveyance rack 10 are realized.

As described above, each arm part 32 of the gripping member 16 extends upward while being inclined inward from the thick part 30*a*. Therefore, in a state where the gripping member 16 is disposed in the tube insertion hole 12, a space is formed between the outer side of each arm part 32 and the recess 50*a* of the inner wall 50. This space is a clearance space when each arm part 32 is pushed by the tube and elastically deformed outward. When the inner wall 50 is tapered (inclined) so as to spread outward in the vicinity of the upper opening 18, the clearance space is further secured.

FIG. 11 illustrates a state in which a tube T2 is inserted in the tube insertion hole 12. When the tube T2 is inserted into the tube insertion hole 12, the bottom surface of the tube T2 abuts on the edge wall part 50*b* (see FIG. 10) of the inner wall 50 or the inclined surface 40 of the arm part 32 and is guided toward the central axis C2. While the tube T2 elastically deforms each arm part 32 outward, the tube T2 further moves downward, and the bottom surface of the tube T2 abuts on the bottom surface hole 54. In this state, the contact surface 42 of each arm part 32 is in contact with the side surface of the tube T2, and each arm part 32 grips the tube T2 from the side by its elastic force. At this time, the central axis C3 of the tube T2 and the central axis C2 of the tube insertion hole 12 (and the central axis C1 of the frame-shaped base part 30) coincide with each other. In this manner, the tube T2 is gripped by the gripping member 16 in the standing posture in which the central axis C3 coincides with the central axis C2. Moreover, since the thick part 30a is provided in the frame-shaped base part 30, the arm part 32 is thick, so that the gripping force is improved.

Figure 12:
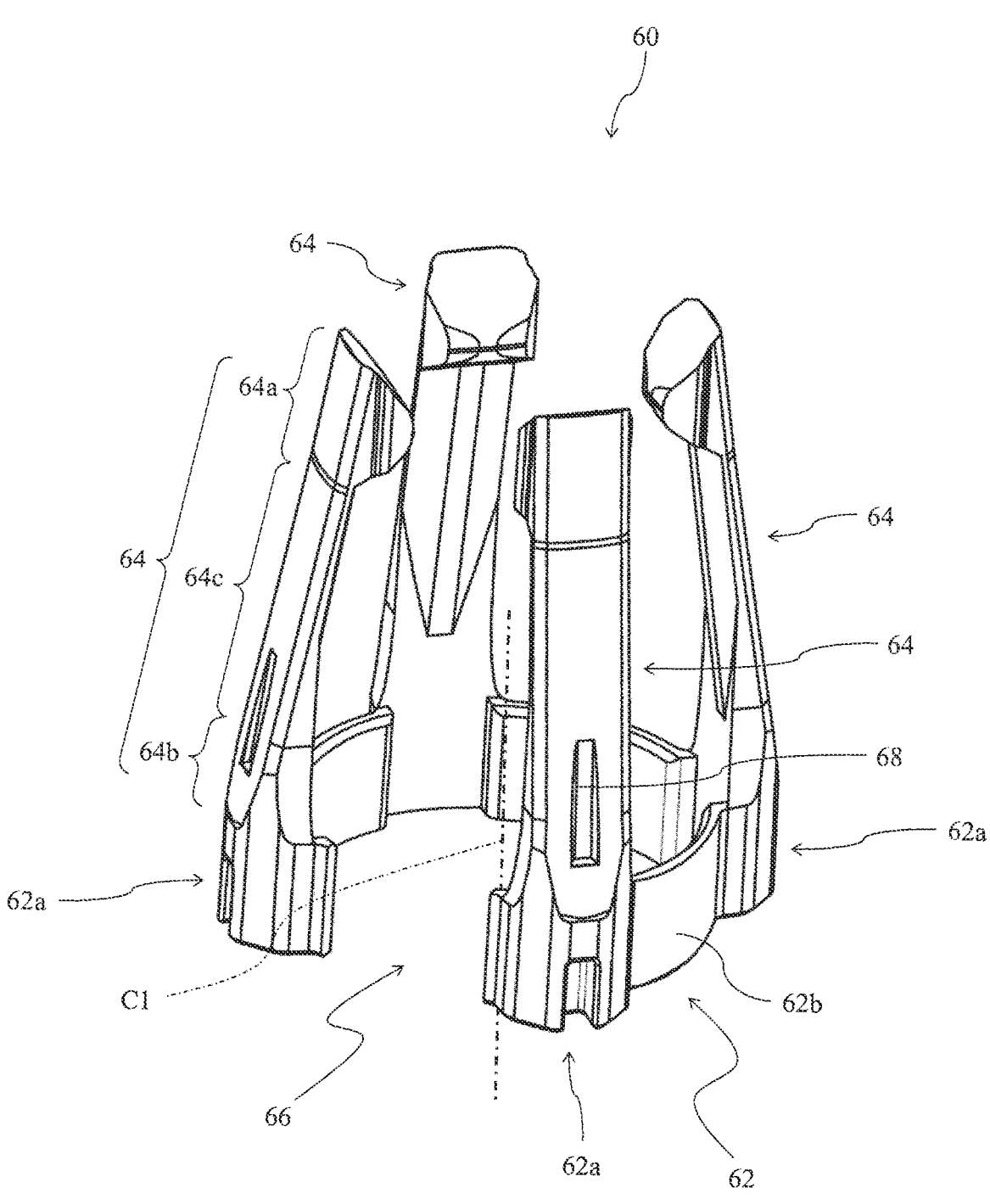
FIG. 12 is a perspective view illustrating a modification of the gripping member.

FIG. 12 is a perspective view of a gripping member 60 according to a modification. Like the gripping member 16 (see FIG. 3), the gripping member 60 includes a frame-shaped base part 62 and a plurality of arm parts 64 extending upward from the frame-shaped base part 62. The frame-shaped base part 62 includes a thick part 62a bulging laterally to the outside at a joint portion with each arm part 64, and an edge part 62b connecting the adjacent thick parts 30a. The frame-shaped base part 62 has a substantially annular shape centered on the central axis C1.

The gripping member 60 is different from the gripping member 16 in that the frame-shaped base part 62 has a discontinuous part and has a side opening 66 opened to the side. In the example of FIG. 12, there is no single edge part 62b, and the frame-shaped base part 62 has a C-shaped shape in plan view.

The gripping member 60 is different from the gripping member 16 in that the length of the arm part 64 (more specifically, the length of a root part 64b or an extending part 64c) is shorter. As the length of the arm part 64 is shorter, the elastic force of the arm part 64 is greater; that is, the gripping force of the tube is greater. Similarly to the gripping member 16, a groove 68 is formed on the outer surface of the arm part 64. Since the shape of the distal end part 64a of the arm part 64 is similar to the shape of the distal end part 32a of the arm part 32 of the gripping member 16, the description thereof will be omitted.

Like the gripping member 16, the gripping member 60 is disposed in the tube insertion hole 12. However, in the arrangement state in the tube insertion hole 12, the frame-shaped base part 62 of the gripping member 60 is arranged above the frame-shaped base part 30 of the gripping member 16. In the disposed state, the height of the distal end part 64a of the arm part 64 of the gripping member 60 may be equal to the height of the distal end part 32a of the arm part 32 of the gripping member 16. For example, a rib is provided along the circumferential direction on the inner wall 50 of the tube insertion hole 12, and the lower surface of the frame-shaped base part 62 abuts on the upper surface of the rib, whereby the frame-shaped base part 30 is disposed in the tube insertion hole 12.

According to the gripping member 60, the gripping force of the tube can be further improved as compared with the gripping member 16. In addition, compared to the frame-shaped base part 30, when the frame-shaped base part 62 is disposed on the upper side, since the frame-shaped base part 62 has the side opening 66, the operator can confirm a sample in the tube accommodated in the tube insertion hole 12, a cord attached to the tube, and the like through the side opening 20 (see FIG. 2) and the side opening 66 of the tube insertion hole 12.

Figure 13:
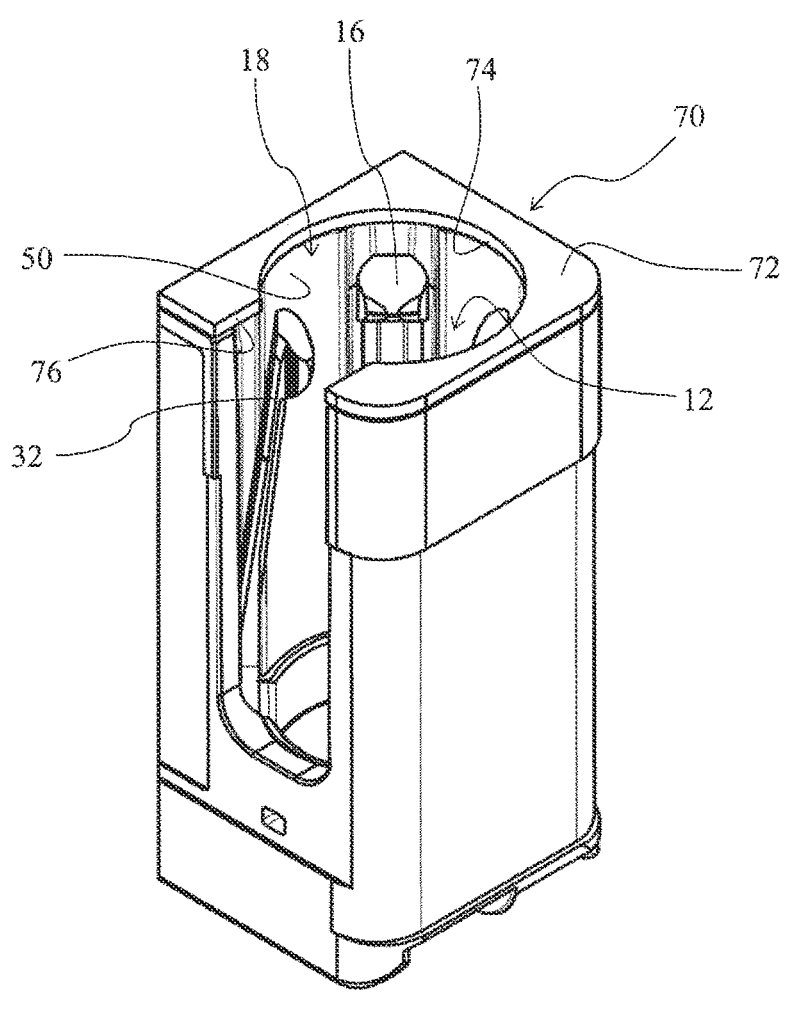
FIG. 13 is a perspective view illustrating a state in which a lid is attached to the tube insertion hole.

FIG. 13 is a perspective view illustrating a state in which a lid 70 is attached to the tube insertion hole 12. The lid 70 is a plate-like member as a whole having a plate part 72, an insertion hole 74, and a side opening 76. The lid 70 is attached to the upper end of the tube insertion hole 12 so as to cover a part of the upper opening 18 of the tube insertion hole 12.

With the lid 70 attached, the tube can be inserted into the tube insertion hole 12 through the insertion hole 74. The insertion hole 74 has a substantially circular shape. Accordingly, when the bottom surface of the tube abuts on the edge part of the insertion hole 74, the tube can be guided to the center side of the tube insertion hole 12. In addition, in a state where the lid 70 is attached, the operator can confirm the sample in the tube accommodated in the tube insertion hole 12, a cord attached to the tube, and the like through the side opening 76.

In a state where the lid 70 is attached to the tube insertion hole 12, the plate part 72 covers a portion of the inner wall 50 of the tube insertion hole 12 facing the arm part 32 from above. This prevents the tube (in particular, the blade) from being caught between the arm part 32 and the inner wall 50.

Although the embodiment according to the present invention has been described above, the present invention is not limited to the above embodiment, and various modifications can be made without departing from the gist of the present invention.

REFERENCE SIGNS LEST

10 Tube conveyance rack
12 Tube insertion hole
14 Rack body
16, 60 Gripping member
18 Upper opening
20, 66, 76 Side opening
30, 62 Frame-shaped base part
30a, 62a Thick part
30b, 62b Edge part
32, 64 Arm part
32a, 64a Distal end part
32b, 64b Root part
32c, 64c Extending part
34 Protruding part
36 Fitting hole
38, 68 Groove
40 Inclined surface
40a Wide region
40b Narrow region
42 Contact surface
50 Inner wall
50 Recess
50b Edge wall part
54 Bottom surface hole
70 Lid
72 Plate part
74 Insertion hole

The invention claimed is:

1. A tube conveyance rack comprising:
a rack body having a tube insertion hole that is opened upward; and
a gripping member arranged in the tube insertion hole,
wherein the gripping member includes
a frame-shaped base part formed in a frame shape and arranged horizontally along an inner wall of the tube insertion hole, and a plurality of arm parts that extend upward from the frame-shaped base part and grip a side of a tube inserted in the tube insertion hole by elastic force of the arm parts, and the frame-shaped base part includes, for each arm part, a bulge portion that bulges radially outward from the frame-shaped base part in a horizontal direction orthogonal to an extension direction of the frame-shaped base part at a joint portion with the arm part, the frame-shaped base part further including a plurality of arc-shaped edge portions that connect adjacent bulge portions, wherein an inner wall of the tube insertion hole includes a vertical slot recess having a shape corresponding to a shape of the bulge portion, wherein at least a portion of each arm part is configured to move into a corresponding vertical slot recess in which a corresponding bulge portion resides upon insertion of a tube into the tube insertion hole.

2. The tube conveyance rack according to claim 1, wherein the bulge portion is formed so as to bulge laterally to outside of the frame-shaped base part.

3. The tube conveyance rack according to claim 1, wherein at a distal end part of each arm part of the plurality of arm parts, an inclined surface facing upward and inward is formed.

4. The tube conveyance rack according to claim 3, wherein a maximum width of the inclined surface is greater than a width of an extending part of a corresponding arm part of the plurality of arm parts.

5. The tube conveyance rack according to claim 3, wherein the inclined surface has a first region that becomes wider from an upper side toward a lower side.

6. The tube conveyance rack according to claim 5, wherein the inclined surface is located at the lower side of the first region and has a second region that becomes narrower from the upper side to the lower side, and in the distal end part of each arm part of the plurality of arm parts, there is formed a contact surface that is configured to come into contact with a tube when the tube is inserted.

7. The tube conveyance rack according to claim 1, wherein each arm part of the plurality of arm parts includes a groove extending vertically and provided on an outer surface of the arm part.

8. The tube conveyance rack according to claim 1, wherein by an engagement of the bulge portion and the vertical slot recess, the gripping member is fixed in the tube insertion hole.

9. The tube conveyance rack according to claim 8, wherein each arc-shaped edge portion that connects the bulge portions is in an arc shape centered on a center of a space surrounded by the frame-shaped base part in plan view.

10. The tube conveyance rack according to claim 9, wherein an inner wall of the tube insertion hole has, between adjacent vertical slot recesses, an arc portion in an arc shape centered on a central axis of the tube insertion hole in plan view.

11. The tube conveyance rack according to claim 1, wherein the frame-shaped base part includes a protruding part protruding laterally to outside of the frame-shaped base part, and an inner wall of the tube insertion hole includes a fitting hole to which the protruding part is engaged.

12. The tube conveyance rack according to claim 1, wherein the frame-shaped base part has a discontinuous part and has a side opening opened to one side of the frame-shaped base part.

13. The tube conveyance rack according to claim 1, further comprising a lid that includes an insertion hole to which the tube is inserted and covers the tube insertion hole so as to cover a portion facing each arm part of the plurality of arm parts, in the inner wall of the tube insertion hole.

* * * * *